United States Patent [19]
Dehennau et al.

[11] Patent Number: 5,173,345
[45] Date of Patent: Dec. 22, 1992

[54] FLEXIBLE MULTILAYER STRUCTURES COMPRISING A LAYER OF VINYLIDENE CHLORIDE COPOLYMER BONDED TO A LAYER OF PLASTICIZED VINYL CHLORIDE POLYMER AND THEIR USE FOR THE MANUFACTURE OF PACKAGING

[75] Inventors: Claude Dehennau, Waterloo; Serge DuPont, Vilvoorde, both of Belgium

[73] Assignee: Solvay S.A., Brussels, Belgium

[21] Appl. No.: 730,591

[22] Filed: Jul. 16, 1991

[30] Foreign Application Priority Data

Jul. 27, 1990 [BE] Belgium .............................. 09000748

[51] Int. Cl.$^5$ .............................................. B29D 22/00
[52] U.S. Cl. .................... 428/36.7; 428/35.4; 428/36.6; 428/518
[58] Field of Search ...................... 428/518, 35.4, 36.6, 428/36.7; 525/228

[56] References Cited

U.S. PATENT DOCUMENTS 4,774,146 9/1988 Dehennau et al. .................. 428/518
4,959,269 9/1990 Dehennau ........................... 428/421

FOREIGN PATENT DOCUMENTS 0259899 3/1988 European Pat. Off. .

OTHER PUBLICATIONS

World Patents Index Latest Acc. No. 82-46866E Week 23 Derwent Publ. Ltd. London, GB; JP-A-57070140 (Saotome, K.) Apr. 30, 1982.
World Patents Index: Acc. No. 71-109935 Week 06 Deiwent Publ. Ltd. London GB; JP-A-46004839 (Nippon Synthetic Orein).

Primary Examiner—Edith Buffalow
Attorney, Agent, or Firm—Spencer, Frank & Schneider

[57] ABSTRACT

The flexible multilayer structures comprise a layer of vinylidene chloride copolymer bonded to a layer of plasticized vinyl chloride polymer with the aid of a polymeric adhesive consisting of a mixture of vinyl acetate polymer and of polymethyl methacrylate, for which the product of the vinyl acetate weight content, expressed in per cent, multiplied by the dynamic viscosity at 100° C. and $1 \text{ s}^{-1}$, expressed in kPa s, is greater than $1.3 \times 10^3$.

The flexible multilayer structures may be in the form of films, sheets, cartons or flexible pouches which can be employed in the packaging field.

11 Claims, No Drawings

FLEXIBLE MULTILAYER STRUCTURES COMPRISING A LAYER OF VINYLIDENE CHLORIDE COPOLYMER BONDED TO A LAYER OF PLASTICIZED VINYL CHLORIDE POLYMER AND THEIR USE FOR THE MANUFACTURE OF PACKAGING

The present invention relates to flexible multilayer structures comprising a layer of vinylidene chloride copolymer bonded to a layer of plasticised vinyl chloride polymer and more particularly to such structures in which the abovementioned polymers are bonded with the aid of a polymeric adhesive comprising a vinyl acetate polymer, and to the use of these structures for the manufacture of packaging.

It is well known to improve the gas and vapour impermeability of various packages made of bulk thermoplastic polymers such as polyolefins and vinyl chloride polymers, by using them in combination with a vinylidene chloride copolymer within a structure with multiple polymeric layers (multilayer structure). Plasticised vinyl chloride polymers form bulk polymers which are particularly suited for the manufacture of flexible and impervious packaging.

Patent Application FR-A-86.10,317 (Solvay & Cie) describes coextruded flexible multilayer structures within which a vinylidene chloride copolymer is used in combination with a plasticised vinyl chloride polymer with the aid of a polymeric adhesive consisting of a mixture of a copolymer of vinyl acetate and ethylene (EVA) and of a copolymer of vinyl chloride and vinyl acetate (VC-VA) whose shear elastic modulus G' at 121° C. and $10^{-4}$ cycles/second is higher than $0.5 \times 10^3$ Pa. The adhesives in question provide an excellent resistance to delamination at room temperature, both before and after sterilisation with steam at 121° C. It has turned out, however, that these adhesive mixtures exhibit a deficient heat stability, which results in a yellowish colouring, or even the presence of black spots in the coextruded multilayer structures, when the manufacturing cycles are extended for a number of hours. This deficient heat stability appears to be attributable chiefly to the presence of vinyl chloride and acetate copolymers within the adhesive mixtures of the prior art. Resorting to copolymers of vinyl acetate and ethylene by themselves in order to bond a layer of vinylidene chloride copolymer to a layer of plasticised vinyl chloride polymer produces multilayer structures which cannot be employed in practice because of the appearance of major creasing caused by the layers slipping over each other.

The present invention is aimed at providing flexible multilayer structures comprising a layer of vinylidene chloride copolymer bonded to a layer of plasticised vinyl chloride polymer with the aid of a polymeric adhesive comprising a vinyl acetate polymer, which structures do not exhibit the abovementioned disadvantages. It is aimed more particularly at providing polymeric adhesives with improved thermal stability ensuring, furthermore, an excellent resistance to delamination at room temperature and when heated, both before and after sterilisation with steam at 121° C.

To this end, the invention provides flexible multilayer structures comprising a layer of vinylidene chloride copolymer bonded to a layer of plasticised vinyl chloride polymer with the aid of a polymeric adhesive comprising a vinyl acetate polymer, which are characterised in that the polymeric adhesive consists of a mixture of vinyl acetate polymer and of polymethyl methacrylate, for which the product of the vinyl acetate weight content, expressed in per cent, multiplied by the dynamic viscosity at 100° C. and 1 $s^{-1}$, expressed in kPa s, is greater than $1.3 \times 10^3$.

The invention therefore essentially lies in the use of a polymeric adhesive as defined above for bonding and making a layer of vinylidene chloride copolymer adhere to a layer of plasticised vinyl chloride polymer within a flexible multilayer structure comprising at least one layer of vinylidene chloride copolymer bonded to a layer of plasticised vinyl chloride polymer.

The use of the polymeric adhesives according to the invention permits the manufacture of transparent multilayer structures which are colourless and free from black spots and creases, and whose peeling resistance before and after steam sterilisation at 121° C. is generally higher than 10 N/cm at room temperature and higher than 2 N/cm at 80° C.

Still better results are obtained when the product of the weight content of the polymeric adhesive made of vinyl acetate, expressed in per cent, multiplied by its dynamic viscosity at 100° C. and 1 $s^{-1}$, expressed in kPa s, is greater than $1.5 \times 10^3$.

A surprising effect of the present invention lies in the fact that mixtures of polymeric adhesives which do not satisfy the claim, that is to say for which the product of the weight ratio of vinyl acetate, expressed in per cent, multiplied by the dynamic viscosity at 100° C. and 1 $s^{-1}$, expressed in kPa s ($[VA] \times [\eta]$) is smaller than $1.3 \times 10^3$, exhibit a delamination resistance which is very considerably lower than the abovementioned values.

For the purposes of the present invention a vinyl acetate polymer is intended to denote the homopolymer and the copolymers of vinyl acetate and ethylene containing at least 50% by weight of vinyl acetate. The best results are obtained with binary copolymers of vinyl acetate and ethylene containing from 60 to 90% by weight of vinyl acetate and still more particularly with those containing from 70 to 85% by weight of vinyl acetate, which are consequently given preference.

The vinyl acetate polymers as defined above are polymers which are more or less tacky and, because of this, difficult to use, and which can give rise to "blocking" phenomena. To counter this disadvantage, it is advantageous to employ a vinyl acetate polymer coated with a thermoplastic polymer. According to a preferred embodiment of the invention, a vinyl acetate polymer is therefore employed, coated with a thermoplastic polymer preferably consisting of polyvinyl chloride. The thermoplastic coating polymer is generally present in a proportion of at most 10% by weight of the vinyl acetate polymer.

The vinyl acetate polymers, homopolymers and copolymers with ethylene, and the polymethyl methacrylate, are polymers which are well known per se. They can be manufactured by any of the conventional techniques of radical polymerisation of ethylenically unsaturated monomers.

The relative proportions of vinyl acetate polymer and of polymethyl methacrylate may vary within a wide range, provided, of course, that the claim (product $[VA] \times [\eta] > 1.3 \times 10^3$) is satisfied. Even the addition of very small quantities of polymethyl methacrylate, of the order of a few per cent, produces a significant improvement in the heat stability of the polymeric adhesive when compared with the adhesives of the prior art. The incorporation of increasing quantities of polymethyl methacrylate increases the heat stability of the adhesive further without altering its delamination resistance. Nevertheless, because of the fact that polymethyl methacrylate tends to "stiffen" the adhesive layer, the polymeric adhesives according to the invention generally contain not more than 50% by weight of polymethyl methacrylate. The quantity of polymethyl methacrylate generally does not exceed 25% by weight. The polymeric adhesives according to the invention therefore preferably contain at least 75% by weight of vinyl acetate polymer, more particularly of a binary copolymer of vinyl acetate and ethylene, containing from 60 to 90% by weight of vinyl acetate, the remainder consisting of polymethyl methacrylate.

Polymeric adhesives which are very particularly preferred according to the present invention consist of 95 to 85% by weight of a binary copolymer of vinyl acetate and ethylene, containing from 60 to 90% by weight of vinyl acetate and of 5 to 15% by weight of polymethyl methacrylate.

A vinyl chloride polymer is here intended to denote the polymers containing at least 70% by weight of monomer units derived from vinyl chloride. The vinyl chloride polymers which can be employed for producing the flexible multilayer structures according to the invention include, therefore, both the homopolymers of vinyl chloride and its copolymers containing monomer units derived from one or more comonomers and their mixtures. By way of nonlimiting examples of such comonomers for vinyl chloride there may be mentioned olefins such as ethylene, propylene and styrene, and esters such as vinyl acetate and alkyl acrylates and methacrylates. Preference is given to vinyl chloride homopolymers.

A plasticised vinyl chloride polymer is here intended to denote the vinyl chloride polymers such as defined above, whose Shore A hardness, measured according to ASTM Standard D 2240, does not exceed 95 and, preferably, 90. The Shore A hardness is usually at least 60. By way of examples of such plasticised polymers there may be mentioned those containing approximately 35 to 75 parts by weight of plasticiser and, preferably at least 40 parts by weight of plasticiser per 100 parts by weight of vinyl chloride polymer. The plasticisers which may be employed can be chosen freely from the usual monomeric or polymeric plasticisers for vinyl chloride polymers. By way of nonlimiting examples of such plasticisers there may be mentioned phthalates, sebacates, adipates, trimellitates, pyromellitates, citrates and polyesters such as poly-$\epsilon$-caprolactone and their mixtures.

It is also possible to use so-called internally plasticised vinyl chloride polymers obtained by copolymerising vinyl chloride with plasticising comonomers such as, for example, ethylhexyl acrylate, or else by graft copolymerisation onto so-called "elasticising" polymers such as poly-$\epsilon$-caprolactone.

A vinylidene chloride copolymer is here intended to denote vinylidene chloride copolymers containing from 60 to 95% by weight of vinylidene chloride, the remainder consisting of one or more ethylenically unsaturated comonomers such as, for example, vinyl chloride, acrylic and methacrylic acids and esters, and acrylic and methacrylic nitriles. Preference is given to copolymers containing approximately 75 to 85% by weight of vinylidene chloride.

It is to be understood that each of the constituent polymers of the multilayer structures according to the invention may contain the usual additives employed in the use of this polymer, such as, for example, lubricants, plasticisers, heat stabilisers, light stabilisers, fillers, pigments and the like.

The way in which the multilayer structures according to the invention are obtained is not critical It is therefore possible to make use of all the usual techniques for assembling polymeric layers to produce the multilayer structures according to the invention. As an example of such a technique there may be mentioned thermal bonding with the aid of a solution of the mixture of adhesives in a solvent or a mixture of appropriate solvents. Solvents which are suitable for this assembly technique are, for example, aromatic hydrocarbons such as toluene, chlorinated hydrocarbons such as methylene chloride, ketones such as acetone and methyl ethyl ketone, ethers such as tetrahydrofuran, and esters such as ethyl acetate, and their mixtures. Nevertheless, preference is given to tetrahydrofuran. In practice, the thermal bonding with the aid of a solution of a mixture of adhesives is performed by cold coating, for example with the aid of a doctor blade, of a film, a sheet or of a plate of plasticised vinyl chloride polymer using a solution of the mixture of adhesives, drying the coating and hot-pressing the coated (precoated) film, sheet or plate onto a film or sheet of vinylidene chloride copolymer. The optimum heat-bonding temperature and time will be assessed by experiments in each particular case. They depend especially on the thickness of the assembled polymeric layers and on the processing additives which may be incorporated in the various polymers.

Other usual and appropriate techniques for assembling polymeric layers to produce the multilayer structures according to the invention are those in which the constituent polymers are processed at a temperature which is at least equal to their softening temperature, such as heat-lamination (hot pressing the polymeric layers preformed, for example, by extrusion), coextrusion and coextrusion-doubling.

The multilayer structures according to the invention comprise at least three layers, namely a layer of plasticised vinyl chloride polymer (A) bonded to a layer of vinylidene chloride copolymer (C) with the aid of a polymeric adhesive according to the invention (B) (ABC structures). They may also comprise a larger number of layers. Thus, the outer face of the vinylidene chloride copolymer layer (C) may be bonded to a thermoplastic polymer other than polyvinyl chloride (E), such as, for example, a polyolefin, a copolymer of ethylene and vinyl acetate, a polyester or a polyamide, with the aid of an appropriate adhesive layer (D) (asymmetric ABCDE structures). Nevertheless, preference is given to symmetric structures with five layers consisting of a middle layer of vinylidene chloride copolymer (C) bonded on both sides to a layer of plasticised vinyl chloride polymer (A) with the aid of a polymeric adhesive according to the invention (B) (ABCBA structures). Any one of the assembly techniques described above can be used for producing such composites in which the vinylidene chloride copolymer layer forms an inner layer. On the other hand, assembly techniques such as heat-bonding and heat-lamination are preferred for producing structures with three layers, in which the vinylidene chloride copolymer forms an outer layer.

The thickness of the constituent polymeric layers of the multilayer structures according to the invention and the total thickness of the said structures is not critical and depends, of course, on the use for which they are intended and on the required degree of imperviousness. To put it more quantitatively, the total thickness of the flexible multilayer structures according to the invention is generally between 130 and 3500 microns and, preferably, between 180 and 2000 microns. The thickness of the vinylidene chloride copolymer layer is generally between 10 and 850 microns and, preferably, between 20 and 500 microns, and that of the intermediate layers providing the adhesiveness between 1 and 100 microns and, preferably, between 2 and 50 microns. The multilayer structures according to the invention can therefore be in the form of films, sheets, cartons and flexible pouches. They can be employed advantageously for the manufacture of packaging for foodstuff, pharmaceutical and cosmetic products. The symmetrical flexible multilayer structures with five polymeric layers are very particularly suitable for the manufacture of cartons and sterilisable pouches for packaging nutritional or physiological liquids and, in particular, blood, solution or dialysis pouches.

The examples which follow are intended to illustrate the invention.

Examples 1 to 3, according to the invention, and Examples 4 to 6, for comparison, all relate to multilayer structures obtained by heat-bonding a film of vinylidene chloride and vinyl chloride copolymer containing 22% by weight of vinyl chloride, 70 μm in thickness, to a flexible polyvinyl chloride sheet with a thickness of 1.5 mm obtained by processing a composition containing 68 parts of diisodecyl phthalate per 100 parts by weight of polyvinyl chloride.

In Examples 1 to 3 the vinyl acetate polymer employed is a binary copolymer of vinyl acetate and ethylene, containing 82% by weight of vinyl acetate and having a melt index (MI) of 1.65 at 170° C. under a 10-kg load. In Examples 4 to 6, for comparison, it is a binary copolymer of vinyl acetate and ethylene, containing 68% by weight of vinyl acetate, which has a melt index of 89 under the same conditions. In all the examples the polymethyl methacrylate employed has a melt index of 35, measured at 210° C. under a 10-kg load.

The composition of the polymeric adhesives employed in Examples 1 to 6, in particular the weight ratio of the vinyl acetate copolymer to the polymethyl methacrylate (PVA/PMMA), the weight content of vinyl acetate [VA] and the dynamic viscosity at 100° C. and 1 s$^{-1}$ [$\eta$], and the product [VA]×[$\eta$] appear in Table I, appended.

The dynamic viscosity of the polymeric adhesives is evaluated in a rheometer which makes it possible to measure the mechanical and dynamic properties of the polymers from the glassy or crystalline state to the molten state. The measurements are carried out on discs from 1 to 2 mm in thickness and 25 mm in diameter taken from samples prepared from solutions containing 20% by weight of the polymeric adhesives in tetrahydrofuran. After evaporation of the tetrahydrofuran for 48 hours at room temperature the polymeric residue is heated to 100° C. for 2 minutes and is then pressed at 100° C. for 2 minutes at a pressure of 80 bars. The pressed sample is then cooled at a pressure of 80 bars to room temperature, after which it is cut into discs.

The measurement consists in determining the moduli G' and G" at a frequency $\nu$ of 0.16 cycles per second, that is to say at a velocity gradient of 1 s$^{-1}$ and at a temperature of 100° C. The dynamic viscosity at 100° C. and 1 s$^{-1}$ is calculated using the following formula:

$$\eta = \frac{\sqrt{G'^2 + G''^2}}{2 \pi \nu}$$

A vinylidene chloride copolymer film is coated, with the aid of a 200-μm wire doctor blade, with a solution of polymeric adhesive at a concentration of 20% by weight in tetrahydrofuran and the coating is dried for 3 minutes in an oven conditioned at 80° C. The dry coating is 30 μm in thickness. The precoated vinylidene chloride copolymer film is pressed hot onto a layer of flexible polyvinyl chloride for 1.30 minutes and at a pressure of 30 bars in a press maintained at 140° C., and the composite is then transferred to a cold press and is kept in it for 8 minutes at room temperature at the same pressure.

Table II, appended, gives the results of the evaluation of adhesiveness, measured, as the peeling resistance, of the multilayer structures according to Examples 1 to 6. The peeling resistance is measured on a Frank type 650 tensometer by following a method suggested by ASTM Standard D 1876-72. Before the measurement, the samples are conditioned for 24 hours in a constant-temperature room at 23° C. (adhesiveness at 23° C.), or for 20 minutes in a ventilated oven at 80° C. (adhesiveness at 80° C.). The adhesiveness is also evaluated, after heat conditioning at 23° C. and at 80° C. in the abovementioned conditions, on other samples cut from the same multilayers which have previously been subjected for 30 minutes to steam sterilisation at 121° C. in an autoclave.

Comparison of the results of the examples according to the invention with those of the comparative examples shows the appreciable superiority of the polymeric adhesives according to the present invention in respect of the adhesiveness at room temperature and at 80° C., both before and after sterilisation, over the polymeric adhesives of the same composition but which do not conform to the claim (product [VA×$\eta$]<1.3×10$^3$).

Table III, appended, shows the results of the evaluation of the dynamic heat stability of the polymeric adhesives according to Examples 1 and 3, and of two polymeric adhesives according to the prior art, conforming to the adhesives according to Examples 1 and 3 except that the polymethyl methacrylate therein has been replaced with 10 parts (Example 7 for comparison) or 50 parts (Example 8 for comparison) of a copolymer of vinyl chloride and vinyl acetate containing 10% by weight of vinyl acetate, with a K value of 60.

The dynamic thermal stability was evaluated in an internal mixer with twin counterrotating cams rotating at 50 rev/min, the trough of which is heated progressively from 90 to 230° C. at a rate of 4° C./min. After the melting of the material, during which the torque exerted on the cams increases with the rise in temperature, the torque begins to decrease in step with the temperature rise. The instant when the change in the torque as a function of the temperature reached by the material is changed forms the onset of thermal degradation. Table III, appended, shows the time elapsed from the beginning of heating to the onset of thermal degradation, and the temperature reached by the material at this instant.

Comparison of the results of the evaluation of the dynamic thermal stability of the adhesives according to the invention (Examples 1 and 3) with those of the adhesives according to the prior art (Examples 7 and 8)

adequately shows the gain in thermal stability produced by the adhesives according to the present invention.

TABLE I

| Example No. | Composition of the polymeric adhesive | | | |
|---|---|---|---|---|
| | PVA/PMMA weight ratio | [VA], % by weight | η, kPa s | [VA] × η |
| 1 | 90/10 | 74 | 25 | 1850 |
| 2 | 75/25 | 61.5 | 29 | 1783 |
| 3 | 50/50 | 41 | 40 | 1640 |
| 4 | 90/10 | 61 | 9.5 | 580 |
| 5 | 75/25 | 51 | 10.5 | 536 |
| 6 | 50/50 | 34 | 18 | 612 |

TABLE II

| Example No. | Peeling resistance (adhesiveness), newton/cm before/after sterilisation | | | |
|---|---|---|---|---|
| | at 23° C. | | at 80° C. | |
| 1 | 20.7 | >30* | 3 | 2.33 |
| 2 | 11.1 | >30* | 2.7 | 3.2 |
| 3 | 10.40 | 15.3 | 2.3 | 2.3 |
| 4 | 4 | 4.61 | 0.18 | 0.21 |
| 5 | 4.85 | 4.52 | 0.19 | 0.21 |
| 6 | 4.19 | 3.54 | 0.21 | 0.22 |

*Rupture of the vinylidene chloride copolymer film

TABLE III

| Example No. | Dynamic thermal stability (onst of degradation) | |
|---|---|---|
| | Elapsed time, min | Material temperature, °C. |
| 1 | 38.5 | 215 |
| 3 | 39.5 | 218 |
| 7 | 24 | 190 |
| 8 | 14 | 190 |

We claim:

1. A flexible multilayer structure comprising a layer of vinylidene chloride copolymer bonded to a layer of plasticised vinyl chloride polymer with a polymeric adhesive comprising a mixture of vinyl acetate polymer selected from the group consisting of vinyl acetate homopolymer and copolymers of vinyl acetate and ethylene containing at least about 50% by weight of vinyl acetate and polymethyl methacrylate, for which the product of the vinyl acetate weight content, expressed in per cent, multiplied by the dynamic viscosity at 100° C. and 1 s$^{-1}$, expressed in kPa s, is greater than $1.3 \times 10^3$.

2. The flexible multilayer structure according to claim 1, wherein the product of the vinyl acetate weight content of the polymeric adhesive, expressed in per cent, multiplied by its dynamic viscosity at 100° C. and 1 is $^{-1}$, expressed in kPA s, is greater than $1.5 \times 10^3$.

3. The flexible multilayer structure according to claim 1, wherein the vinyl acetate polymer is a binary copolymer of vinyl acetate and ethylene, containing from 60 to 90% by weight of vinyl acetate.

4. The flexible multilayer structure according to claim 1, wherein the polymeric adhesive contains polymethyl methacrylate in a quantity not exceeding 50% by weight.

5. The flexible multilayer structure according to claim 4, wherein the polymeric adhesive contains polymethyl methacrylate in a quantity not exceeding 25% by weight.

6. The flexible multilayer structure according to claim 1, wherein the polymeric adhesive consists of 95 to 85% by weight of a binary copolymer of vinyl acetate and ethylene, containing from 60 to 95% by weight of vinyl acetate, and of 5 to 15% by weight of polymethyl methacrylate.

7. The flexible multilayer structure according to claim 1, wherein including three layers consisting of a layer of plasticised vinyl chloride polymer bonded to a layer of vinylidene chloride copolymer with the aid of a polymeric adhesive layer consisting of a mixture of a polymer of vinyl acetate and ethylene and of polymethyl methacrylate.

8. The flexible multilayer structure according to claim 1, including five layers of a middle layer of vinylidene chloride copolymer bonded on both sides to a layer of plasticised vinyl chloride polymer with the aid of a polymeric adhesive layer consisting of a mixture of a copolymer of vinyl acetate and ethylene and of polymethyl methacrylate.

9. In a process of manufacturing flexible packaging for foodstuff, pharmaceutical and cosmetics products, the improvement comprising manufacturing said packaging from flexible multilayer structures according to claim 1.

10. In a process for manufacturing sterilizable pouches intended for packaging nutritional or physiological liquids, the improvement comprising manufacturing said pouches from flexible multilayer structures according to claim 8.

11. In a process for manufacturing sterilizable cartons intended for packaging nutritional or physiological liquids, the improvement comprising manufacturing said cartons from flexible multilayer structures according to claim 8.

* * * * *